Figure 4:
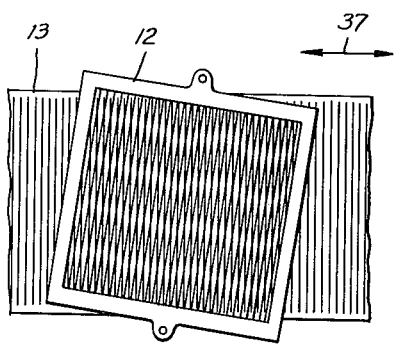

Jan. 4, 1966  A. T. SHEPHERD ETAL  3,227,888
PHOTOELECTRIC OR MAGNETIC APPARATUS FOR DETERMINING THE
EXTENT AND SENSE OF RELATIVE MOVEMENT
Filed March 20, 1962  2 Sheets-Sheet 1
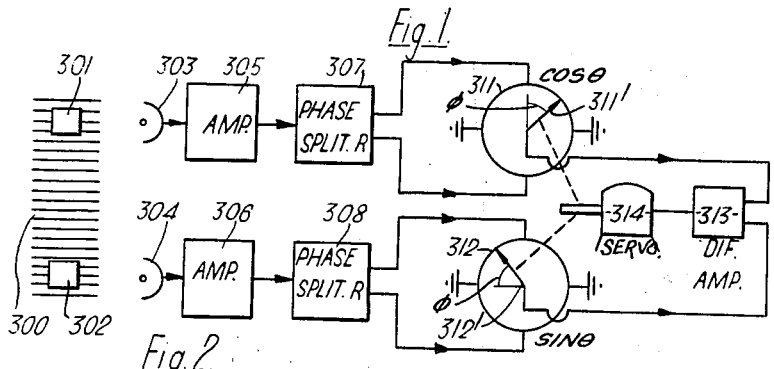
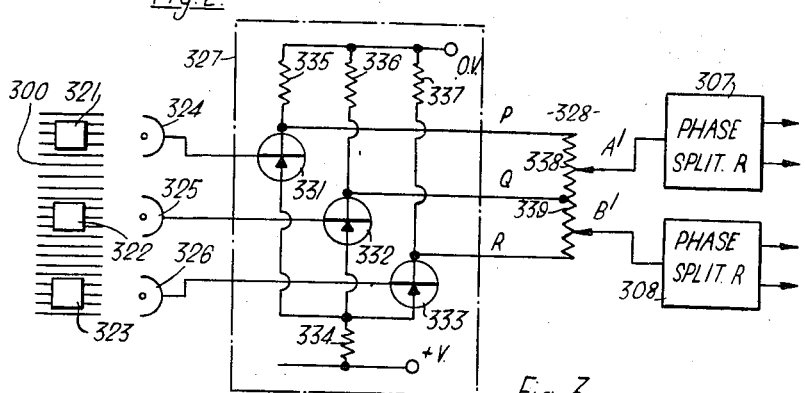
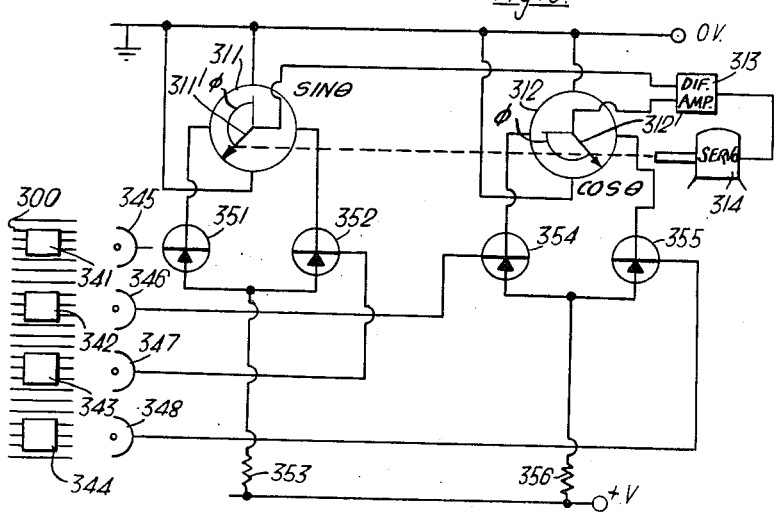
Inventors
A. T. SHEPHERD
A. G. KERR
By
Cameron, Kerkam & Sutton
Attorneys Jan. 4, 1966 A. T. SHEPHERD ETAL 3,227,888
PHOTOELECTRIC OR MAGNETIC APPARATUS FOR DETERMINING THE
EXTENT AND SENSE OF RELATIVE MOVEMENT
Filed March 20, 1962 2 Sheets-Sheet 2

INVENTORS
A. T. SHEPHERD
A. G. KERR
BY
Cameron, Kerkam & Sutton
ATTORNEYS

United States Patent Office
3,227,888
Patented Jan. 4, 1966

3,227,888
PHOTOELECTRIC OR MAGNETIC APPARATUS FOR DETERMINING THE EXTENT AND SENSE OF RELATIVE MOVEMENT
Alexander Turnbull Shepherd and Andrew Guy Kerr, Edinburgh, Scotland, assignors to Ferranti, Limited, Hollinwood, Lancashire, England, a company of Great Britain and Northern Ireland
Filed Mar. 20, 1962, Ser. No. 181,036
Claims priority, application Great Britain, Mar. 29, 1961, 11,437/61
12 Claims. (Cl. 250—237)

This invention relates to measuring apparatus for determining the extent and sense of the movement of a first object in one or other of two opposite directions with respect to a second object, and is a modification of the invention described and claimed in U.S. Patent No. 2,886,717.

In accordance with U.S. Patent No. 2,886,717, measuring apparatus for determining the extent and sense of the relative movement of a first object in one or other of two opposite directions with respect to a second object comprises means for setting up a cyclic wave pattern adapted to move with respect to said second object in dependence on the said relative movement of said first object, two detecting devices adapted during the said movement of the pattern to respond electrically to the conditions of the pattern at two positions fixed with respect to the second object where said conditions are out of phase with one another by a fraction of half the cyclic wavelength of the pattern, and electrical stages for determining the sense of the said relative movement of said object from the relative phase of the electrical output signals from said detecting devices and for determining the extent of said movement from the number of cycles of said output signals which occur during said movement.

In U.S. Patent No. 2,886,717 the response of the apparatus is in the digital form of a pulse count. In some applications, however, a response in analogue, or at least smoother, form is preferable.

An object of the present invention is accordingly to provide measuring apparatus for the purpose stated which is a modification of the apparatus disclosed in U.S. Patent No. 2,886,717 in so far that the response is in smoother form.

In accordance with the present invention, measuring apparatus for determining the extent and sense of the relative movement of a first object in one or other of two opposite directions with respect to a second object includes means for setting up a cyclic wave pattern arranged to move with respect to said second object in dependence on the said relative movement of said first object, at least two detecting devices arranged to respond electrically to the conditions of the pattern at a like number of positions, each to each, fixed with respect to the second object, a cosine potentiometer and a sine potentiometer the wipers of which are ganged to the same angle as one another, means for energising the potentiometers by signals derived by the detecting devices from the pattern so as to be proportional at any given moment to the sine and cosine, respectively, of an angle representing a condition of the pattern at that moment, and a reversible servo motor arranged to be driven in dependence on the difference between the output voltages of the potentiometers, the motor being coupled to drive the ganged wipers in the direction for nulling said difference, said conditions of the pattern being so out of phase with one another that in operation the angular position of the ganged wipers is maintained by the motor in close correspondence with the said angle.

The invention will now be described by way of example as applied to a machine tool, the first object being the worktable and the second object the framework of the tool.

Figure 5:
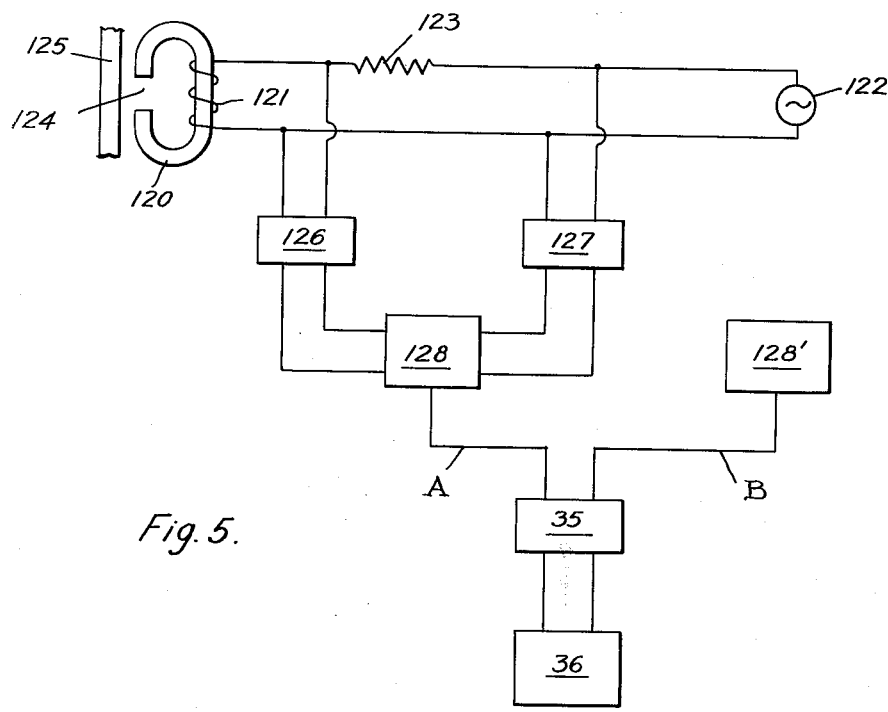

In the accompanying drawings, FIGURES 1 to 3 are schematic diagrams of three embodiments of the invention, FIG. 4 is an enlarged scale drawing of superimposed optical gratings and FIG. 5 is a schematic drawing illustrating an arrangement wherein the optical pattern is replaced by a recorded magnetic pattern with the detecting devices in the form of a magnetic pick-up which yields positional information.

In FIGURE 1 a cyclic wave pattern, which may be an optical pattern similar to that described with reference to FIGURE 2 of U.S. Patent No. 2,886,717, is represented at 300. For convenience, FIG. 2 of U.S. Patent No. 2,886,717 is reproduced herein as FIG. 4 and comprises two superimposed optical gratings 12 and 13. The lines of gratings 13 are normal to the direction of movement of the worktable which movement may be in one or the other of two opposite directions 37. It will be assumed for convenience of explanation that this direction is horizontal and that accordingly the lines of grating 13 are vertical. Owing to the skew relationship of the two gratings, they produce together a cyclic coincidence pattern of alternate opacities and transparencies as described in detail in U.S. Patent No. 2,886,717. The pattern is arranged to move with the worktable (not shown) past two positions 301 and 302 which are fixed with respect to the framework of the tool. The conditions of the pattern at these two positions are 90 electrical degrees out of phase with one another—that is, they are in quadrature—and so may be represented by the expressions $\sin \theta$ and $\cos \theta$ where $\theta$ itself represents the angular position of the pattern with respect to some datum point on the reference structure.

To respond electrically to these conditions of the pattern respectively there are provided two detecting devices in the shape of photocells 303 and 304, which are also fixed with respect to the framework. Because of the phase relationship just mentioned, the output signals from the cells as the pattern moves past them are in quadrature and so are proportional to $\sin \theta$ and $\cos \theta$ respectively.

The signal from cell 303 is applied by way of an amplifier 305 to a phase-splitting stage 307 the balanced counter-phase outputs of which are applied to energise a cosine potentiometer 311. Similarly the signal from cell 304 is applied by way of an amplifier 306 and a phase-splitter 208 to energise a sine potentiometer 312.

The respective wipers $311^1$ and $312^1$ of the potentiometers are connected to a difference amplifier 313 the output from which is applied as an error signal to drive a reversible servo motor 314. The motor shaft is coupled to drive wipers $311^1$ and $312^1$, which are ganged to the same angle $\phi$.

In operation, as the pattern moves past the cells in response to movement of the worktable the cells supply electrical signals in quadrature as already described in the present specification, and as previously described in U.S. Patent No. 2,886,717. Potentiometer 311 is thus energised in proportion to $\sin \theta$ and so supplies an output proportional to the product of $\sin \theta$ and $\cos \phi$. Similarly potentiometer 312 supplies an output proportional to the product of $\cos \theta$ and $\sin \phi$. Hence the output from difference amplifier 313 is proportional to:

$$(\sin \theta \times \cos \phi) - (\cos \theta \times \sin \phi) = \sin (\theta - \phi)$$

The sense of this output from amplifier 313 is such that, in response to energisation by it, motor 314 drives the potentiometer wipers in the direction for nulling this quantity, thereby causing $\phi$ to have approximately the value θ. Hence the extent and sense of worktable movement with respect to the frame may be determined from the extent and direction of the angular movement of the motor shaft from a datum position.

The response of the apparatus is thus of a greater smoothness than that of apparatus which provides the measurement in the form of a pulse count rather than a shaft rotation. The actual degree of smoothness depends on the closeness with which the potentiometers 311 and 312 are wound; the less the potential difference between successive points engaged by the wipers the greater the degree of smoothness. In any case, during the actual movement of the pattern, the response is additionally smoothed by the inertia of the motor.

Whenever the direction of the movement of the worktable and pattern changes, the sense of the expression $(\theta - \phi)$ changes too, with the result that the motor reverse its direction of operation.

Where it is necessary to stabilise the response against in-phase disturbances, such as changes of the supply voltages or, where the pattern is an optical pattern and the detecting devices are photocells, changes of the brightness of the light source which illuminates the pattern, the arrangement of FIGURE 1 may be modified as shown in FIGURE 2.

Here the pattern 300 has three positions 321 to 323 where the conditions are out of phase with one another by 120 electrical degrees. The light from these positions illuminates photocells 324 to 326 respectively. Because of this phase relationship, the output signals from the cells as the pattern moves past are in balanced three-phase form.

The actual stabilisation is effected, in a manner to be described, by a stabilising stage 327 to which the signals from the three devices are applied and which supplies a three-phase output signal over leads P, Q and R to a phase-converter stage 328 where they are converted to two-phase form—that is, to two signals in phase quadrature—the leading phase of the two-phase signals being dependent on the phase order of the three-phase signals. These two signals are applied over leads $A^1$ and $B^1$ (corresponding to leads A and B of the parent specification) to phase-splitting stages 307 and 308, which may be as described for FIGURE 1. The rest of the equipment is as before.

In operation, as the pattern drifts past the cells in response to movement of the table, the cells derive their signals in balanced three-phase form, as already described. After stabilisation in stage 327 against in-phase disturbances the signals, still in three-phase form, are applied to converter 328 where they are converted to two-phase form and applied over leads $A^1$ and $B^1$ to the respective phase splitters. Potentiometers 311 and 312 (FIG. 1) are thus energised as before by signals proportional to sin θ and cos φ respectively, where sin θ again represents the condition at position 321, and the motor 314 similarly adjusts their wipers to the positions corresponding approximately to the angle θ.

Stabilising stage 327 may take the form shown in FIGURE 2 of three transistors 331 to 333 sharing a common emitter impedance in the form of a resistor 334, by which they are connected to a source of positive potential. The respective collector electrodes are connected to a source of zero potential through individual load resistors 335 to 337 and to stage 328 by way of leads P, Q, and R respectively. The three photocells 324 to 326 are connected to the base electrodes, each to each.

The stabilising action results from the use of the common emitter resistance 334 and to the fact that in a balanced three-phase system the sum of the respective phase currents at any given moment is zero. Thus the current through resistance 334 is a steady direct one, as determined by the transistor circuit parameters, there being no feedback signal at signal frequency developed across it.

Whenever there is any in-phase disturbance of the input signals—that is, whenever any two, or all three, change simultaneously in the same sense, due to, say, a decrease in the valve of the supply voltage—the current through the resistance 334 changes correspondingly in the sense to maintain the respective base/emitter currents substantially constant. Such changes of signal therefore do not appear in leads P, Q, or R.

The stabilisation of the signals in this manner against in-phase disturbances renders unnecessary the more elaborate and costly procedure of stabilising individually all the possible origins of such disturbances, such as the supply voltages, or, where the pattern is an optical pattern, the brightness of the light which illuminates the pattern or the response characteristics of the photocells.

An important feature of stage 327 is that it is direct-current coupled; such a coupling is required to enable the apparatus to maintain a response condition appropriate to the position reached by the worktable whenever it ceases to move, thereby enabling the apparatus to resume its correct functioning as soon as the table starts to move again.

Phase-converter stage 328 may take various known forms as long as it is direct-current coupled. As shown in FIGURE 2, the stage consists of a potentiometer network including two resistors 338 and 339 connected between leads P and Q, and leads Q and R, respectively. Lead $A^1$ is connected to an adjustable wiper on resistor 338, and lead $B^1$ to an adjustable wiper on resistor 339.

As the phases of the potentials at points on resistors 338 and 339 relative to that of the potential of lead Q change gradually from 0° to 120° as the wipers are moved outwards from lead Q, it is clearly possible to adjust them to tapping points the potentials of which are respectively leading and lagging by 45° on that of lead Q. The signals in leads $A^1$ and $B^1$ then have the required quadrature relationship.

Resistors 338 and 339 should have a high resistance value compared with that of load resistors 335 to 337, and the input circuits of phase-splitter stages 307 and 308 should be of higher resistance still.

A stabilised arrangement may also be attained as shown in FIGURE 3 by the use of four detecting devices 345–348 responsive to the conditions of the pattern 300 at positions 341–344, respectively, spaced 90 electrical degrees apart. The pattern may again be an optical one, with the devices in the form of photocells.

The output from cells 345 and 347, which are in counter-phase, are connected to the base electrodes of two transistors 351 and 352 respectively, the emitters of which are connected through a common resistor 353 to a source of positive potential. The collector electrodes are connected to cosine potentiometer 311 the earth points of which are connected to the zero volts rail for the transistors. Sine potentiometer 312 is similarly energised from cells 346 and 348 by way of transistors 354 and 355 sharing a common emitter resistor 356. The connections from the potentiometers to amplifier 313 and the drive from motor 314 to the respective wipers $311^1$ and $312^1$ are the same as before.

The stabilising action is similar in principle to that of the arrangement of FIGURE 2: any in-phase disturbances are balanced out by the common emitter resistors. The arrangement otherwise operates much as in FIGURE 1, but with each potentiometer energised by separate cells in counterphase, rather than by one cell and a phase splitter.

In any of the above-described embodiments the optical pattern may be replaced by a recorded magnetic pattern with the detecting devices in the form of a magnetic pickup of a kind which yields positional information—that is, which gives a response indicative of the position of the pattern even when it is stationary. One such arrangement is illustrated and described in British Patent No. 760,321 of which FIG. 18 is reproduced herein as FIG. 5. Referring to FIG. 5, the recorded cyclic wave pattern is a magnetic pattern formed sinusoidally on the magnetic recording material, for example, along a length of magnetic tape. The detecting device may be a transductor element having a toroidal core 120 of easily saturable material carrying a winding 121 arranged to be energised by A.C. source 122 of a suitable frequency by way of combined load and limiting resistor 123, as set forth in the aforementioned British Patent No. 760,321. Core 120 is provided with a short air-gap 124 which is close to the pattern on the tape depicted at 125.

Across the supply leads from source 122 is connected a filter stage 126 designed to pass only the second-harmonic component of the energising current and a frequency-doubling stage 127 designed to provide an output having twice the frequency of the fundamental component and being in a fixed phase relationship with it. The resulting outputs from stages 126 and 127, which are twice the frequency of the input, are applied to a phase discriminator 128 arranged to derive from a phase comparison of these currents and the amplitude of the second-harmonic current an output signal which is applied over lead A to a discriminator stage 35 and a differential counter 36, the input to these stages over lead B being derived from a phase discriminator 128′.

Discriminator 128 produces an output signal which varies sinusoidally with variations of the condition of the pattern opposite air-gap 124. A similar signal is produced by discriminator 128′, the currents in leads A and B being out of phase with one another. Preferably, the signals are in quadrature. The stages 35 and 36 operate, as described in British Patent No. 760,321 to determine (a) the sense of that movement from the relative phase of those signals and (b) the extent of the movement from the number of cycles of those signals which occur during said movement.

What we claim is:

1. Measuring apparatus for determining the extent and sense of the relative movement of a first object in one or the other of two opposite directions with respect to a second object of the type including a cyclic wave pattern movable with respect to said second object in dependence on the said relative movement of the first object, comprising at least two detecting devices disposed to respond electrically to the conditions of the pattern at a like number of positions, each to each, fixed with respect to the second object, a cosine potentiometer and a sine potentiometer the wipers of which are ganged to the same angle as one another, means for energising the potentiometers by signals derived by the detecting devices from the pattern so as to be proportional at any given moment to the sine and cosine, respectively, of an angle representing a condition of the pattern at that moment, and a difference stage for deriving a voltage in dependence on the difference between the output voltages of the potentiometers, a reversible servo motor, and connecting means for applying that difference voltage to drive the motor, the motor being coupled to drive the ganged wipers in the direction for nulling said difference, said conditions of the pattern being so out of phase with one another that in operation the angular position of the ganged wipers is maintained by the motor in close correspondence with said angle.

2. Apparatus as claimed in claim 1 where the number of detecting devices is two, wherein the corresponding conditions of the pattern are 90 electrical degrees out of phase with one another, and said means for energizing the potentiometers include for each potentiometer a phase-splitting stage to the input of which is connected the appropriate one of said devices.

3. Apparatus as claimed in claim 1 where the number of detecting devices is four, wherein the corresponding conditions of the pattern are 90 electrical degrees out of phase with one another, and said means for energising the potentiometers include for each pair of devices responsive to counterphase conditions of the pattern a stabilising stage the output from which is applied to energise the appropriate one of said potentiometers.

4. Apparatus as claimed in claim 1 wherein the cyclic wave pattern is an optical pattern and which includes means for providing the pattern comprising two optical gratings secured to said first object and to said second object respectively and ruled in relation to produce together said cyclic wave pattern in the form of a coincidence pattern of alternate opacities and transparencies, and wherein said detecting devices include photo-electric elements disposed to be respectively illuminated by the light from such parts of the coincidence pattern as are located at said positions.

5. Apparatus as claimed in claim 4 wherein the lines of one grating are slightly skew with respect to the lines of the other grating.

6. Apparatus as in claim 1 wherein the cyclic wave pattern is a magnetic pattern and which includes means for providing the pattern comprising a magnetic recording material on which said magnetic pattern is formed, and wherein said detecting devices include transducer elements located at said positions.

7. Measuring apparatus for determining the extent and sense of the relative movement of a first object in one or the other of two opposite directions with respect to a second object of the type including a cyclic wave pattern movable with respect to said second object in dependence on the said relative movement of the first object, comprising three detecting devices disposed to respond electrically to the conditions of the pattern at a like number of positions, each to each, fixed with respect to the second object, a cosine potentiometer and a sine potentiometer the wipers of which are ganged to the same angle as one another, means for energising the potentiometers by signals derived by the detecting devices from the pattern so as to be proportional at any given moment to the sine and cosine, respectively, of an angle representing a condition of the pattern at that moment, the corresponding conditions of the pattern being 120 electrical degrees out of phase with one another, said means for energising the potentiometers including a stabilising stage followed by a phase-converting stage for deriving from the three-phase output from the detecting devices two signals in quadrature with one another, the direction of said movement determining which of these signals is the leading signal, a phase-splitting stage for each potentiometer including connections to energise that potentiometer in dependence on the appropriate one of said two signals, and a difference stage for deriving a voltage in dependence on the difference between the output voltages of the potentiometers, a reversible servomotor, and connecting means for applying that difference voltage to drive the motor, the motor being coupled to drive the ganged wipers in the direction for nulling said difference.

8. Apparatus as claimed in claim 7 wherein the stabilising stage includes three amplifier devices arranged to receive as inputs the signals from the detecting devices, each to each, and provided with an impedance common to all three input circuits.

9. Measuring apparatus for determining the extent and sense of the relative movement of a first object in one or the other of two opposite directions with respect to a second object of the type including a cyclic wave pattern arranged to move with respect to said second object in dependence on the said relative movement of the first object, comprising four detecting devices disposed to respond electrically to conditions of the pattern at a like number of positions, each to each, fixed with respect to the second object, a cosine potentiometer and a sine potentiometer the wipers of which are ganged to the same angle as one another, means for energising the potentiometers by signals derived by the detecting devices from the pattern so as to be proportional at any given moment to the sine and cosine, respectively, of an angle representing a condition of the pattern at that moment, the corresponding conditions of the pattern being 90 electrical degrees out of phase with one another, said means for energising the potentiometers including for each pair of devices responsive to counterphase conditions of the pattern a stabilising stage the output from which is applied to energise the appropriate one of said potentiometers, each stabilising stage including two amplifier devices with connections to apply as inputs the signals from the appropriate two detecting devices, each to each, and provided with an impedance common to both input circuits, and a difference stage for deriving a voltage in dependence on the difference between the output voltages of the potentiometers, a reversible servomotor, and connections for applying that difference voltage to drive the motor, the motor being coupled to drive the ganged wipers in the direction for nulling said difference.

10. Measuring apparatus for determining the extent and sense of the relative movement of a first object in one or the other of two opposite directions with respect to a second object of the type including a cyclic wave pattern movable with respect to said second object in dependence on the said relative movement of the first object, comprising at least two detecting devices disposed to respond electrically to the conditions of the pattern at a like number of positions, each to each, fixed with respect to the second object, a cosine potentiometer and a sine potentiometer the wipers of which are ganged to the same angle as one another, means for deriving from the detecting devices sine and cosine signals proportional at any given moment to the sine and to the cosine, respectively, of an angle representing the condition of the pattern at that moment, said cosine potentiometer arranged to be energized by the sine signal, said sine potentiometer arranged to be energized by the cosine signal, and a difference stage for deriving a voltage in dependence on the difference between the output voltages of the potentiometers, a reversible servomotor, and connecting means for applying that difference voltage to drive the motor, the motor being coupled to drive the ganged wipers in the direction for nulling said difference, said conditions of the pattern being so out of phase with one another that in operation the angular position of the ganged wipers is maintained by the motor in close correspondence with said angle.

11. Apparatus as claimed in claim 10 wherein the cyclic wave pattern is an optical pattern and which includes means for providing the pattern comprising two optical gratings secured to said first object and to said second object, respectively, and ruled to produce together said cyclic wave pattern in the form of a coincidence pattern of alternate opacities and transparencies, and wherein said detecting devices include photo-electric elements disposed to be respectively illuminated by the light from such parts of the coincidence pattern as are located at said positions.

12. Apparatus as claimed in claim 10 wherein the cyclic wave pattern is a magnetic pattern and which includes means for providing the pattern comprising a magnetic recording material on which said magnetic pattern is formed, and wherein said detecting devices include transducer elements located at said positions.

References Cited by the Examiner
UNITED STATES PATENTS

| | | | |
|---|---|---|---|
| 2,722,156 | 11/1955 | Warren | 250—210 X |
| 2,777,069 | 1/1957 | Saeman | 250—210 X |
| 2,886,717 | 5/1959 | Williamson et al. | 250—220 |
| 2,886,718 | 5/1959 | Shepherd et al. | 250—220 |
| 2,926,335 | 2/1960 | Bower | 340—170 |
| 2,960,910 | 11/1960 | Pelavin | 250—210 X |
| 3,054,902 | 9/1962 | Timms et al. | 250—237 |
| 3,105,907 | 10/1963 | Colten et al. | 250—210 X |

RALPH G. NILSON, *Primary Examiner.*

WALTER STOLWEIN, FREDERICK M. STRADER, *Examiners.*

MICHAEL A. LEAVITT, *Assistant Examiner.*